US 6,571,588 B1

(12) United States Patent
Yuen

(10) Patent No.: US 6,571,588 B1
(45) Date of Patent: Jun. 3, 2003

(54) SECURITY NUT AND KEY ASSEMBLY

(76) Inventor: Po W. Yuen, 17 Olmsted Rd., Scarsdale, NY (US) 10583

( * ) Notice: Subject to any disclaimer, the term of this patent is extended or adjusted under 35 U.S.C. 154(b) by 0 days.

(21) Appl. No.: 09/704,685

(22) Filed: Nov. 3, 2000

(51) Int. Cl.⁷ ................................................ B62H 5/00
(52) U.S. Cl. ........................... 70/233; 70/225; 411/402; 411/910
(58) Field of Search .......................... 81/121.1, 176.15, 81/460; 411/910, 402, 403, 405, 410, 427, 429; 70/233, 232, 225, 226

(56) References Cited

U.S. PATENT DOCUMENTS

| 66,585 A | * | 7/1867 | Harvey | 411/910 X |
|---|---|---|---|---|
| 641,191 A | * | 1/1900 | Champion | 411/402 |
| 1,447,564 A | * | 3/1923 | Norlund et al. | 411/910 X |
| 1,792,711 A | * | 2/1931 | Rockstad | 411/910 X |
| 3,034,386 A | * | 5/1962 | Corlett et al. | 411/910 X |
| 3,172,282 A | * | 3/1965 | Heckrotte | 411/910 X |
| 3,492,841 A | * | 2/1970 | Ipri | 411/910 X |
| 3,604,487 A | * | 9/1971 | Gilbert | 145/50 D |
| 3,693,484 A | * | 9/1972 | Sanderson, Jr. | 81/90 C |
| 4,018,111 A | * | 4/1977 | Goldhaber | 411/910 X |
| 4,027,572 A | * | 6/1977 | Burge | 411/910 X |
| 4,028,915 A | | 6/1977 | Stahl | 70/233 |
| 4,114,409 A | | 9/1978 | Scire | 70/225 |
| 4,187,747 A | * | 2/1980 | Pawlow | 81/177 G |
| 4,302,137 A | * | 11/1981 | Hart | 411/432 |
| 4,502,825 A | * | 3/1985 | Yamada | 411/402 |
| 4,569,259 A | * | 2/1986 | Rubin et al. | 411/910 X |
| 4,621,873 A | | 11/1986 | Weinstein et al. | 70/225 X |
| 4,693,655 A | * | 9/1987 | Omori | 411/910 X |
| 4,724,692 A | | 2/1988 | Turin et al. | 70/225 |
| RE33,114 E | * | 11/1989 | Chiavon | 411/910 X |
| 4,938,108 A | * | 7/1990 | Mekler | 411/910 X |
| 5,005,390 A | | 4/1991 | Giannini et al. | 70/225 |
| 5,007,260 A | | 4/1991 | Sharp | 70/233 |
| 5,022,672 A | | 6/1991 | Kawai | 70/233 X |
| 5,027,628 A | | 7/1991 | De Rocher et al. | 70/233 |
| 5,337,587 A | | 8/1994 | Davidson | 70/233 |
| 5,401,133 A | * | 3/1995 | Kuchler | 411/910 X |
| 5,647,253 A | * | 7/1997 | Pozek | 411/910 X |
| 5,749,690 A | * | 5/1998 | Kutz | 411/910 X |
| 5,863,166 A | * | 1/1999 | Young | 411/910 X |
| 5,875,662 A | | 3/1999 | Denby et al. | 70/233 |
| 5,950,506 A | * | 9/1999 | Busse | 411/910 X |
| 6,036,419 A | * | 3/2000 | Lanham et al. | 411/910 X |
| 6,305,890 B1 | * | 10/2001 | Okamura | 411/910 X |

FOREIGN PATENT DOCUMENTS

SU          769134    * 10/1980    ............. 411/910 X

* cited by examiner

Primary Examiner—Suzanne Dino Barrett
(74) Attorney, Agent, or Firm—Shlesinger, Arkwright & Garvey LLP

(57) ABSTRACT

A security nut and key assembly including an integral lock provided for quick release of a wheel on a bicycle frame or the like while providing anti-theft means adaptable to be programmed so that no two locks will have the same release mechanism.

3 Claims, 4 Drawing Sheets

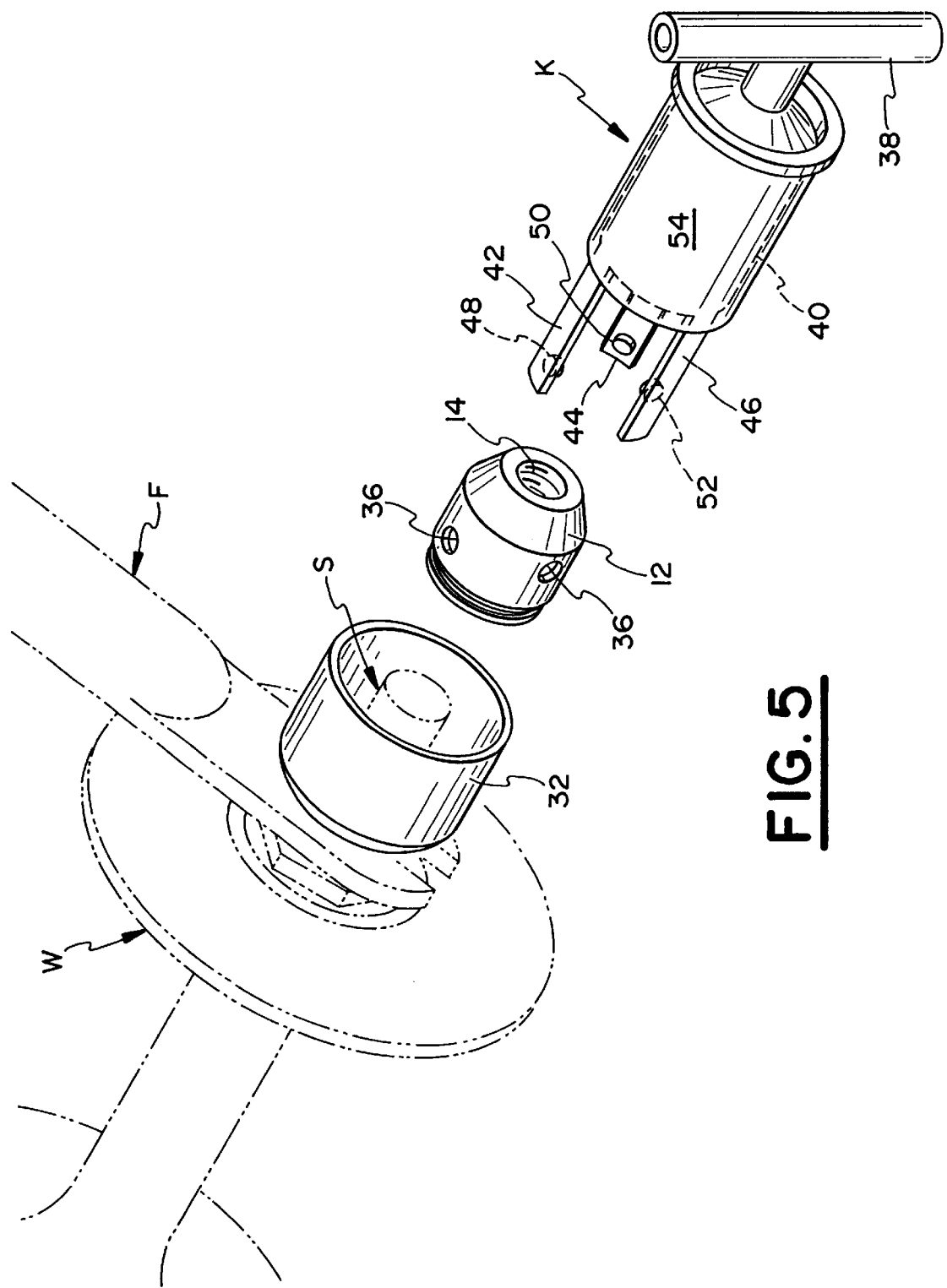

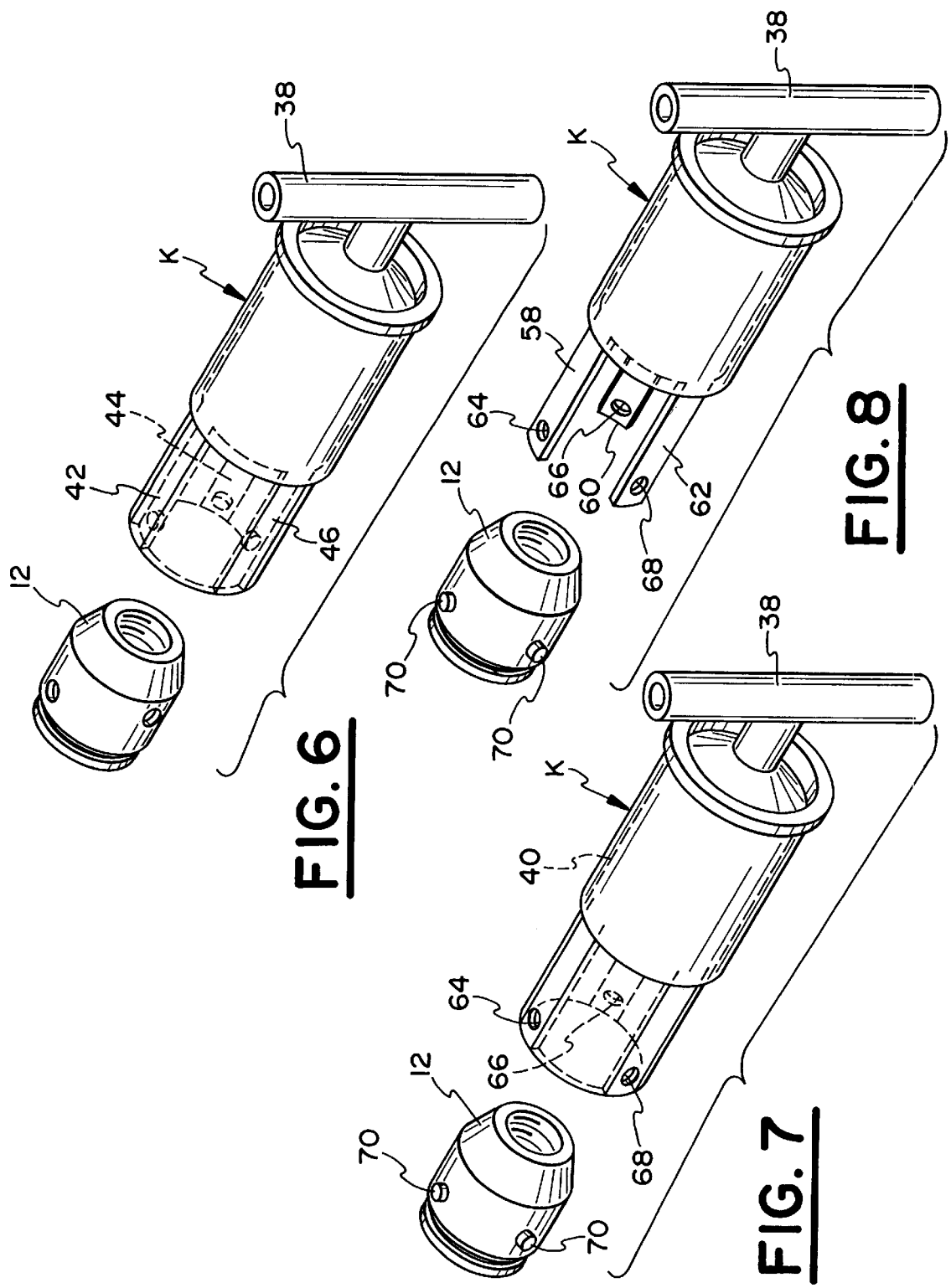

SECURITY NUT AND KEY ASSEMBLY

BACKGROUND OF THE INVENTION

This invention relates to quick release mechanisms for securing an object, and more particularly to a bicycle quick release having a lock assembly to prevent unauthorized wheel removal.

Bicycles are provided with quick release mechanisms for the wheels which allow the wheels to be removed quickly and easily without the use of tools. Conventional types of quick release devices include a hand-operated lever which controls a cam shaft for releasing and securing the wheel to the fork of the bicycle frame. Because of the ease with which the wheels may be removed, it is desirable to secure the wheels of the bicycles with a mechanism which will prevent theft when the bicycle is unattended. Most apparent are chains which are threaded through the spokes of the wheel and secured to an object such as a post, tree or the like.

Various devices have been devised to prevent theft which use some type of lock mechanism. Weinstein U.S. Pat. No. 4,621,873, Scire U.S. Pat. No. 4,114,409, Denby U.S. Pat. No. 5,875,662, Stahl U.S. Pat. No. 4,028,915, Davidson U.S. Pat. No. 5,337,587, Giannini U.S. Pat. No. 5,005,390, Sharp U.S. Pat. No. 5,007,260, DeRocher et al U.S. Pat. No. 5,027,628, Turin U.S. Pat. No. 4,724,692 and Kawai U.S. Pat. No. 5,022,672 all relate to key lock mechanisms or the like with quick release means for removal of a bicycle wheel or the like. The difficulties with these present devices are that the lock mechanisms can be easily picked by theives who are knowledgable about lock picking devices.

OBJECTS AND SUMMARY OF THE INVENTION

It is an object of this invention to provide a security nut and key assembly which can not be readily picked by thieves.

Another object of this invention is to provide a security nut and key assembly which is inexpensive and simple to manufacture.

A further object of this invention is to provide a series of security nut and key assemblies each of which has its own unique pin lock.

A further object of this invention is to provide a unique security nut and key assembly which is compact and has a minimum number of parts.

A still further object of this invention is to provide a unique security nut and key assembly which can be used to secure various parts of a bicycle frame and seat as well as wheel units.

A further object of this invention is to provide a rotatable shield for the nut which prevents gripping of the nut by a vice-grip tool, pliers or the like in order to remove the nut.

In summary this invention relates to a quick release sleeve lock with unique anti-theft features as will be noted in the following description and the drawings which are as follows:

FIG. 5 is an exploded perspective view of the security nut and key assembly with a partial showing of the bicycle wheel fork axle and fork arrangement in phantom lines;

FIG. 6 is a modification of the security nut and key assembly shown exploded with portions of the key shown in dashed lines;

FIGS. 7 and 8 show additional modifications of the security nut and key assembly in exploded views.

FIGS. 7 and 8 show additional modifications of the security nut and key assembly in exploded views.

DESCRIPTION OF THE INVENTION SHOWN IN FIGS. 1 THROUGH 5

Figure 2:
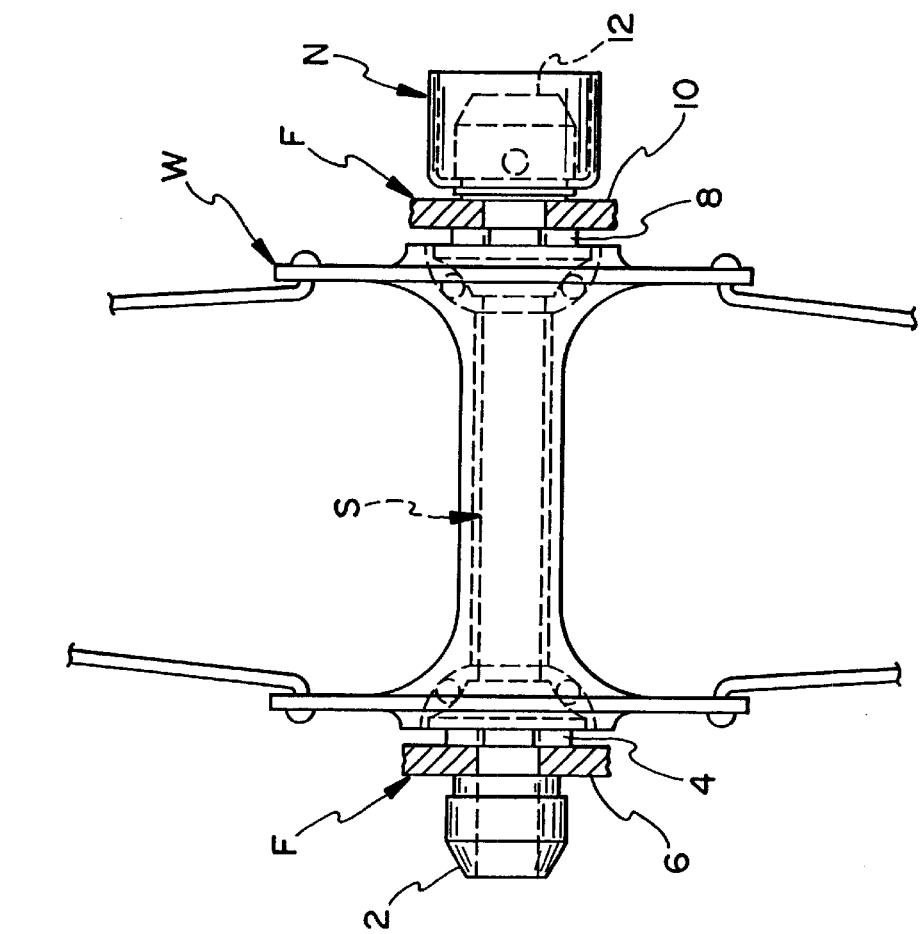
FIG. 2 is a cross-sectional view taken in the lines 2—2 of FIG. 1 and viewed in the direction of the arrows.
Figure 1:
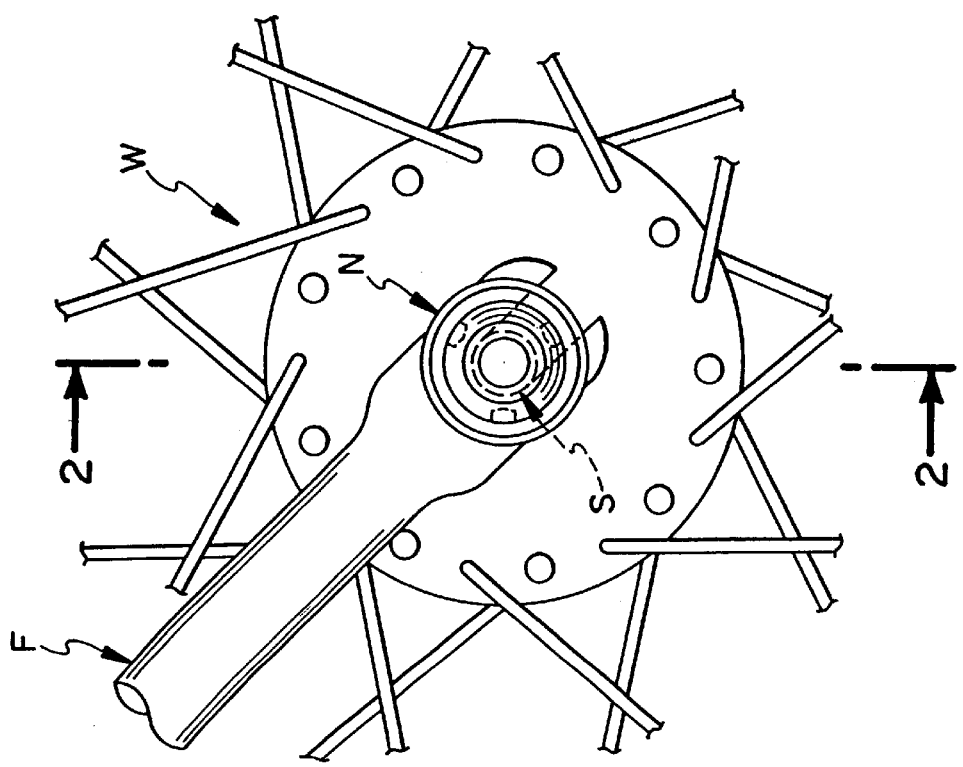
FIG. 1 is a fragmentary side elevational view of a wheel mounted on the fork with the security nut in position.

In the FIGS., 1 through 5, the fork F of the bicycle is shown only fragmentary. The wheel W of which only a portion is shown is mounted on a spindle S. The spindle S includes a head 2 which may be machined on the spindle S or otherwise welded or secured thereto. A washer 4 is positioned between the left fork member 6 and the wheel W. A similar washer 8 is positioned between the wheel W and the right fork 10 as best shown in FIG. 2. The security nut of unit N is positioned on the spindle S.

Figure 3:
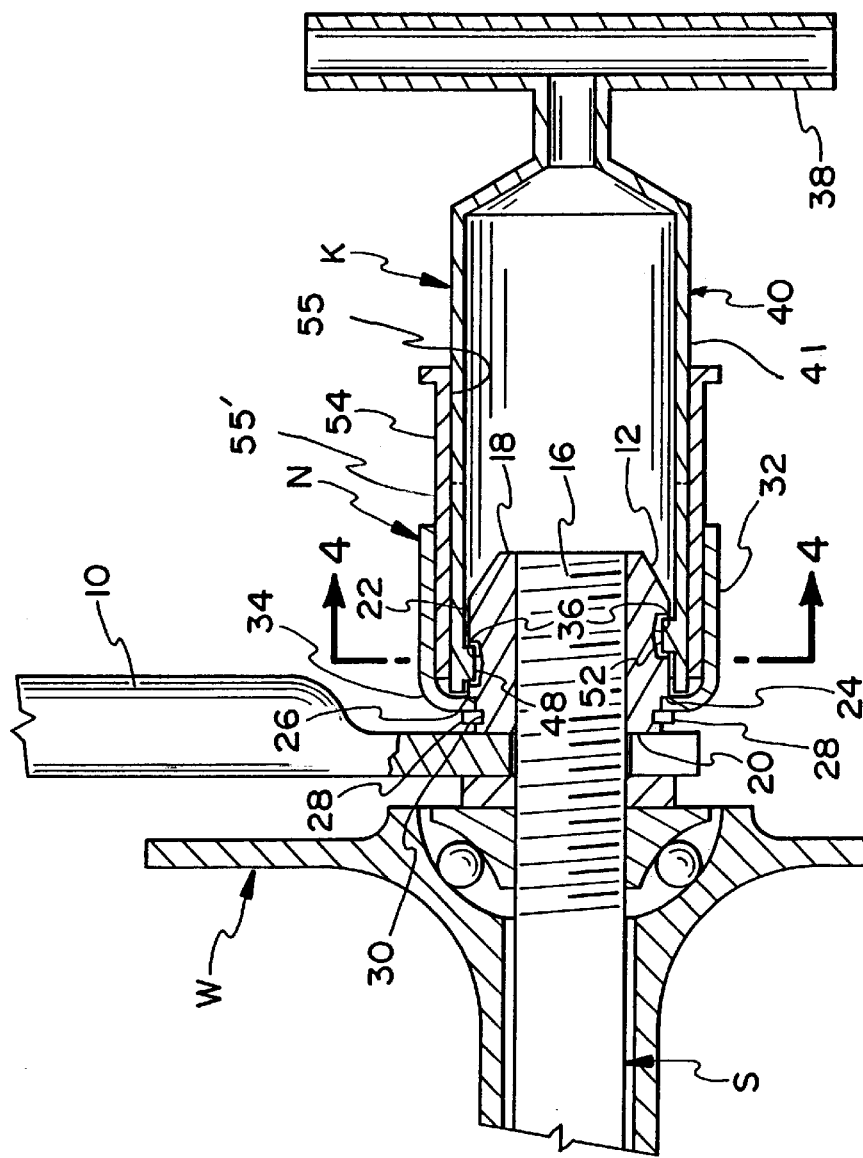
FIG. 3 is a fragmentary enlarged cross-sectional view of the security nut and key assembly.

In FIG. 3 the security nut unit N includes a nut 12 having internal threads 14 (FIG. 5) threaded onto the threads 16 of the spindle S. The nut 12 includes a top 18, a bottom 20, and an outer annular surface 22. As best shown in FIG. 3, the outer annular surface 22 is stepped-down as at 24. The step-down 24 includes a shoulder 26 and a lock washer 28 mounted in a recess 30 in the step-down 24.

Figure 4:
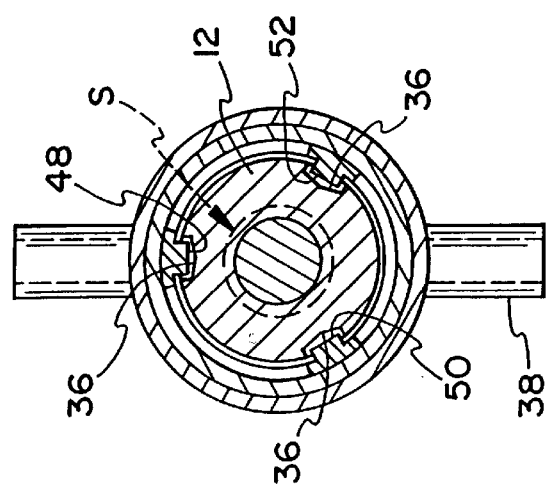
FIG. 4 is a cross sectional view taken on the line 4—4 of FIG. 3.

An annular coaxially positioned shield sleeve 32 is provided with a flange 34 which abuts the step-down 24 and can move laterally between the shoulder 26 and the lock washer 28. The annular coaxially positioned shield sleeve 32 is rotatable about the nut 12 so that a wrench can not be applied to the nut 12 to remove it from the spindle S. It is obvious that the lock washer 28 and recess 30 may not be used, since the annular coaxially positioned shield sleeve 32 may move against the right fork 10. In FIGS. 3, 4, and 5, nut 12 is provided with recesses or detent lock means 36.

It will be apparent that the annular coaxially positioned shield sleeve 32 may be removed from the nut 12 by removing the lock washer 28 and sliding the annular coaxially positioned shield sleeve 32 off the step down 24 once the nut 12 has been removed from the spindle S.

A key K, as best shown in FIGS. 3 and 5, is provided with a T-shaped wrench handle. Other types of twisting mechanisms may be utilized other than as shown in FIG. 3. The key K has an annular sleeve or cap 40 with projecting spring lock fingers 42, 44 and 46 as best shown in FIG. 5. Buttons or detent lock means 48, 50 and 52 engage in cooperating recesses or detent lock means 36 in the nut 12. It is obvious that the recesses 36 can be adjusted circumferentially or vertically and that the spring lock fingers 42, 44 and 46 may be adjusted to cooperate with the positioning of the recesses or detent lock means 36. An infinite number of combinations can be worked out so that each individual key K will be unique.

Surrounding the annular sleeve or cap 40 is a downwardly movable annular locking member 54. The locking member 54 includes a flange 56 for easy insert of the downwardly movable annular locking member 54 or the lifting thereof when removing.

OPERATION

In operation, the nut 12 is gripped by the spring lock fingers 42, 44 and 46 and the sleeve 54 is slid down to maintain the lock fingers 42, 44 and 46 in position while the nut is threaded on the spindle S. The sleeve 54 prevents the fingers 42, 44 and 46 with the buttons 48, 50 and 52 from disengaging from the recesses or detent lock means 36.

Once the nut 12 has been tightly threaded down upon the spindle S, the downwardly movable annular locking member 54 is moved upwardly towards the handle 38 permitting the lock fingers 42, 44 and 46 to spring outwardly and disengage from the recesses or detent lock means 36. It will now be obvious that the nut 12 which is now positioned on the spindle S cannot be removed therefrom since the annular coaxially positioned shield sleeve 12 prevents someone from rotating the nut 12 without having a key K with the proper combination and sleeve 54 to maintain the spring lock fingers 42, 44 and 46 in the recesses or detent lock means 36.

FIG. 6

FIG. 6 is a modification of the development shown in FIGS. 1 through 5 in that the fingers 42, 44 and 46 are not hanging out by themselves as shown in FIG. 5. The annular sleeve or cap 40 extends down the full length of the key and is slotted upwardly to form the fingers 42, 44 and 46 giving lateral support to the fingers 42, 44 and 46 for greater twist operation. The fingers 42, 44 and 46 still flex in the slots cut into the annular sleeve or cap 40.

FIGS. 7 and 8

In FIGS. 7 and 8, a modification is shown in which a spring figures 58, 60 and 62 have the recesses 64, 66 and 68 instead of having recesses in the nut 12 the nut is provided with lugs 70 which snap into the recesses 64, 66 and 68. In FIG. 8 the modification is similar to that of FIG. 6 in that the annular sleeve or cap 40 is slotted.

The basic operation of FIGS. 7 and 8 is similar to the operation of the devices shown in FIGS. 1 through 6.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A security nut and key assembly comprising:

a) a nut having internal threads, a top, a bottom, and upper and lower annular outer surfaces;

b) said lower annular surface having a diameter less than the diameter of said upper annular surface;

c) said nut having a shoulder connecting said upper annular surface with said lower annular surface;

d) said upper and lower annular surfaces each having a top and a bottom;

e) an annular shield sleeve having top and bottom openings;

f) said annular shield sleeve positionable and rotatable on said nut lower annular surface;

g) said annular shield sleeve when positioned on said nut enclosing said nut upper annular surface and extending a substantial distance above said nut top;

h) said annular shield having an inturned annular flange mounted on said nut lower annular surface when said shield is positioned on said nut;

i) said lower annular surface of said nut having an annular recess adjacent said lower annular surface bottom and spaced from said nut shoulder;

j) a lock washer positionable in said nut annular recess;

k) said annular shield annular flange loosely and rotatable positionable between said shoulder and said lock washer;

l) a key having an annular cap having at least one spring lock finger extending downwardly therefrom an integral therewith;

m) said at least one spring lock finger having a first detent lock means;

n) said nut having at least one second detent lock means cooperable with said at least one first detent lock means and positioned on the upper annular surface of said nut;

o) said key including a downwardly movable annular locking member mounted on said annular cap;

p) said nut and said annular shield sleeve forming an open annular chamber sufficient to just receive simultaneously said annular cap and said movable annular locking member when said annular cap and said downwardly movable annular locking member are positioned about said nut thereby providing minimum access to said nut when said key, said annular cap and said downwardly movable annular locking member are removed after locking said nut;

q) at least one of said first and second detent lock means being a recess and the other said first and second detent lock means being a lug receivable in said recess;

r) said annular cap having a uniform diameter outer wall;

s) said annular cap having a substantially uniform thickness except for said first detent lock means;

t) said movable annular locking member having inner and outer walls each having a top and bottom of uniformed diameter from said bottom to adjacent said top with said inner wall of said movable annular locking member engageable with the outer wall of said cap when in locking position;

u) said movable annular locking member having a substantially uniformed thickness from said top to said bottom;

v) said inner and outer walls of said movable annular locking member at said bottom when in locking position being positioned substantially over said first and second detent lock means to prevent separation of said first and second detent lock means during tightening or loosening of said nut;

w) said annular shield sleeve having an inner wall engageable with the outer wall of said movable annular locking member when in locking position;

x) said inner wall of said annular coaxially positioned shield sleeve engaging the bottom of said movable annular locking member when in locking position over said first and second detent lock means;

y) said downwardly movable annular locking member being approximately twice the length of said sleeve;

z) said uniform diameter outer wall of said annular cap extending above the movable annular locking member approximately the length of said shield sleeve when the nut is tightened or removed;

a' whereby when said at least one spring lock finger on said cap has moved into said open annular chamber, said at least one spring lock finger will spring outwardly until said first detent lock means on said at least one spring lock finger engages said at least one second detent lock means on said nut whereupon causing said at least one spring lock finger to spring into lock position so that upon downward moving of said downwardly movable annular locking members, said at least one spring lock finger will be prevented from disengagement from said at least one second detent lock means.

2. A security nut and key assembly as in claim 1, and including:
a) a plurality of spring lock fingers each having a first detent lock means; and
b) said nut outer annular surface having a second detent lock means for each of said plurality of spring lock fingers first detent lock means.

3. A security nut and key assembly as in claim 2, and wherein:
a) said first detent lock means on said plurality of spring lock fingers are coded to fit each of said second detent lock means of said nut.

* * * * *